(12) United States Patent
Imazu et al.

(10) Patent No.: US 6,402,388 B1
(45) Date of Patent: Jun. 11, 2002

(54) OPTICAL CONNECTOR

(75) Inventors: Natsuka Imazu; Kazuhiro Takizawa; Toru Arikawa; Yasuhiro Tamaki; Hiroshi Yokosuka, all of Chiba-ken; Masaaki Takaya; Shinji Nagasawa, both of Tokyo, all of (JP)

(73) Assignees: Nippon Telegraph and Telephone Corporation; Fujikura Ltd., both of Tokyo (JP)

( * ) Notice: Subject to any disclaimer, the term of this patent is extended or adjusted under 35 U.S.C. 154(b) by 0 days.

(21) Appl. No.: 09/284,652

(22) PCT Filed: Aug. 18, 1998

(86) PCT No.: PCT/JP98/03655

§ 371 (c)(1),
(2), (4) Date: Apr. 16, 1999

(87) PCT Pub. No.: WO99/09442

PCT Pub. Date: Feb. 25, 1999

(30) Foreign Application Priority Data

Aug. 18, 1997 (JP) .............................................. 9-221808

(51) Int. Cl.⁷ ................................................ G02B 6/38
(52) U.S. Cl. ........................................... 385/60; 385/70
(58) Field of Search ............................... 385/60, 70–73, 385/76–78, 58, 66, 140

(56) References Cited

U.S. PATENT DOCUMENTS 6,048,102 A * 4/2000 Fukushima ................... 385/72
6,095,695 A * 4/2000 Ohtsuka et al. ............... 385/72

FOREIGN PATENT DOCUMENTS

| JP | 03-036507 | 2/1991 |
| JP | 08-106028 | 4/1996 |

* cited by examiner

Primary Examiner—Frank G. Font
Assistant Examiner—Michael P. Stafiva
(74) Attorney, Agent, or Firm—Burns, Doane, Swecker & Mathis LLP

(57) ABSTRACT

In an optical connector structured having an optical connector ferrule accommodated in a housing urged towards the butt connection direction by an urging means, a technology is developed wherein the application of an external sideways force to the optical connector ferrule in a connected state is prevented, and the connected state is stably maintained.

An optical connector 20 is provided wherein a positioning support part 24 which accommodates and supports a freely detachably a stop guard 26, which projects from the optical fiber ferrule 2, is provided in a housing 21; when this optical connector ferrule 2 is moved towards the butt connection direction, the stop guard is accommodated in the positioning support part 24 and positioned and supported; and when this stop guard 26 is released from the positioning support part 24, floating of the optical connector ferrule 2 in the housing 2 is permitted. Thereby, even if a sideways pressure is applied to the housing 21, a displacing force is not applied to the optical connector ferrule 2, and the butt connection state with the other optical connector ferrule is not affected.

9 Claims, 5 Drawing Sheets

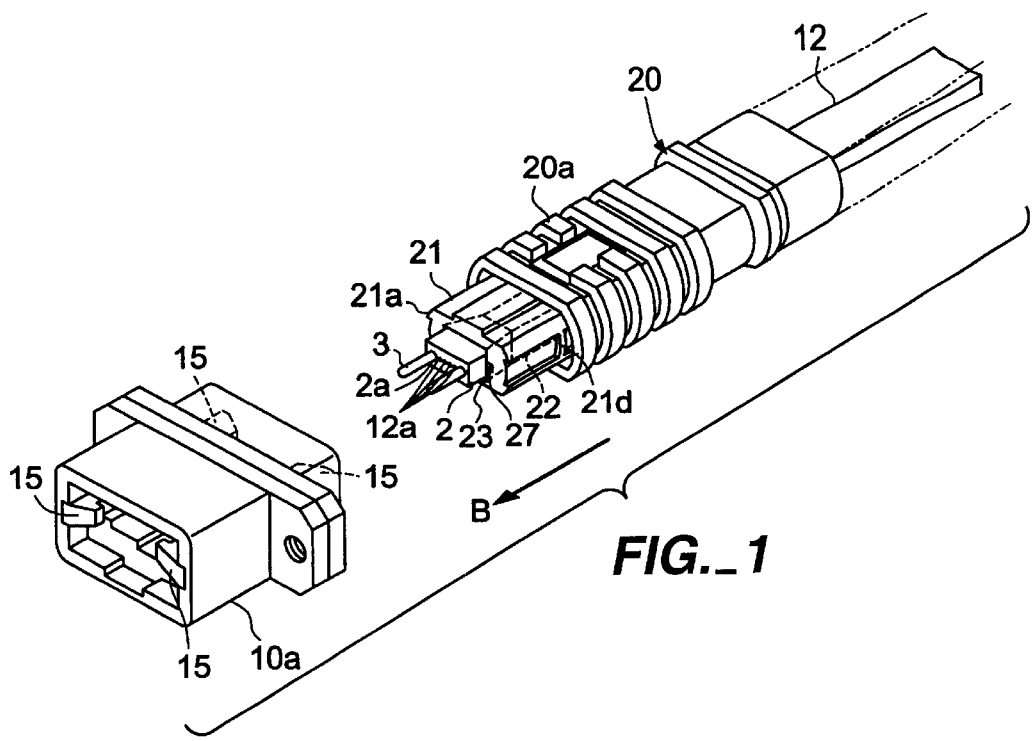
*FIG._1*
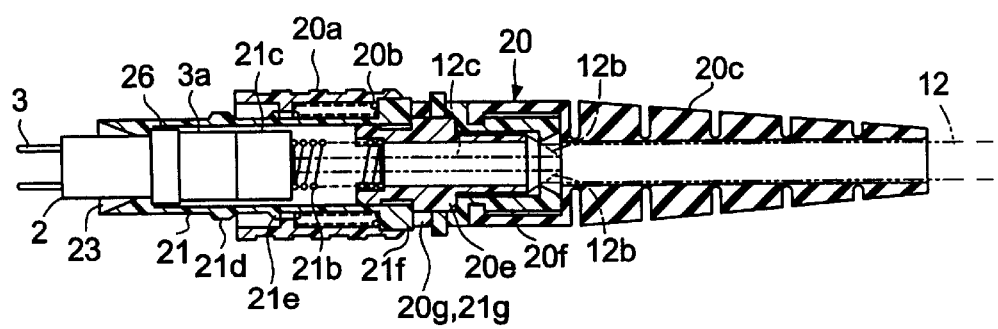
*FIG._2*
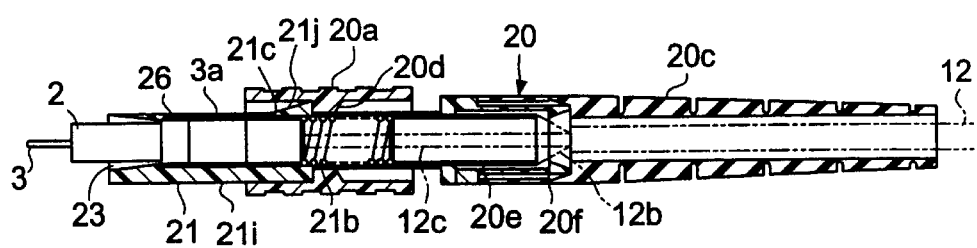
*FIG._3*

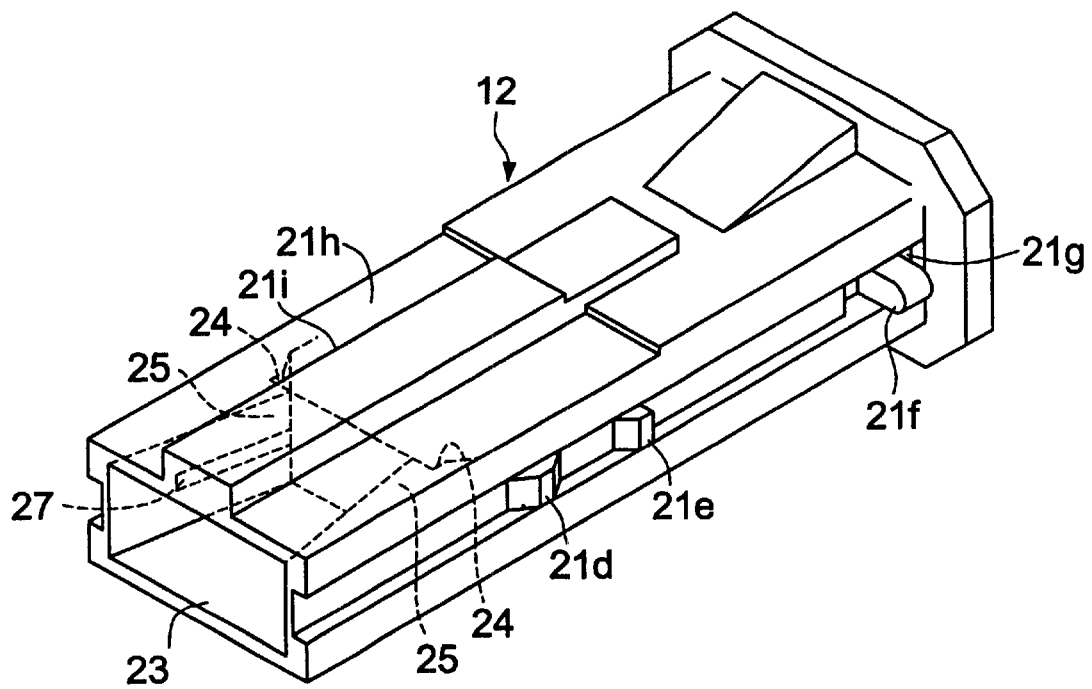
FIG._4
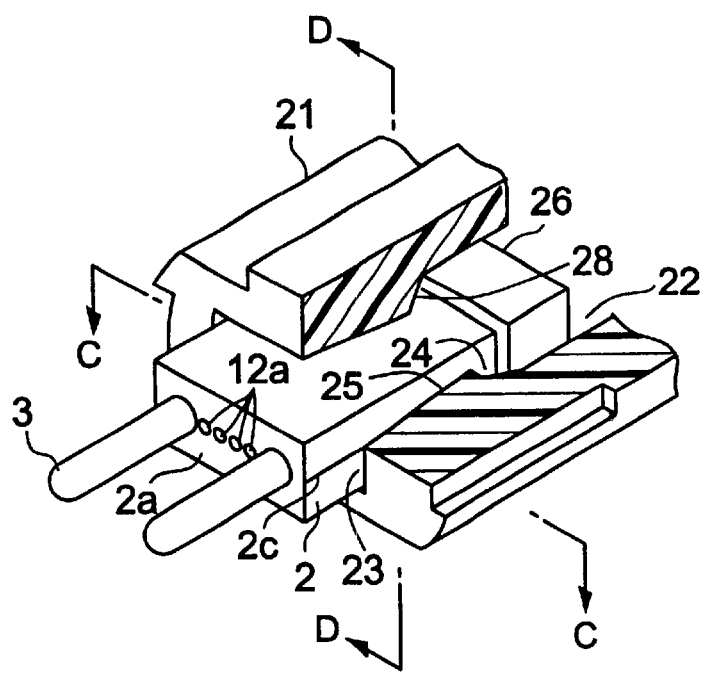
FIG._5

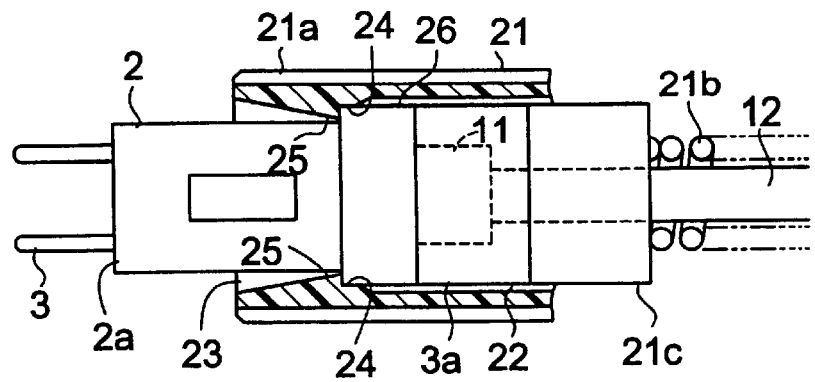
FIG._6
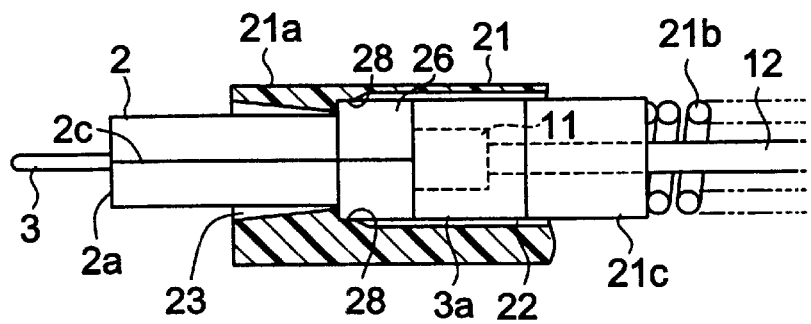
FIG._7
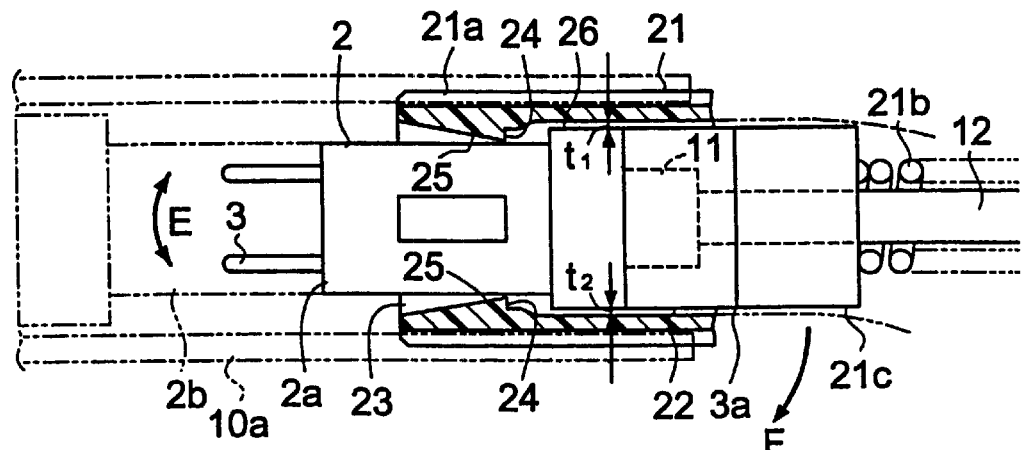
FIG._8

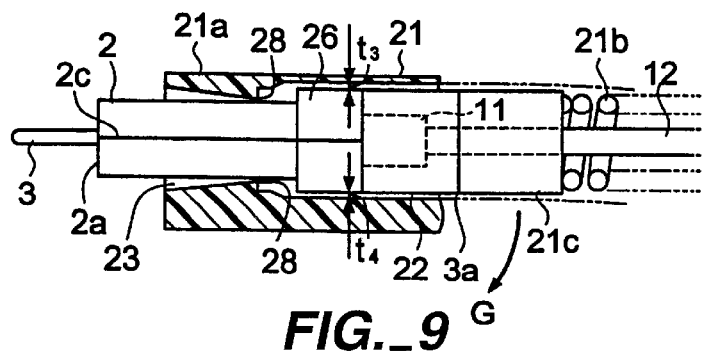
FIG._9
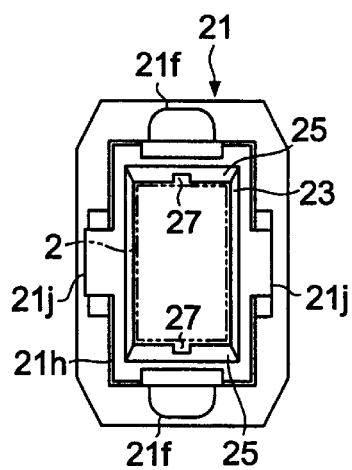
FIG._10
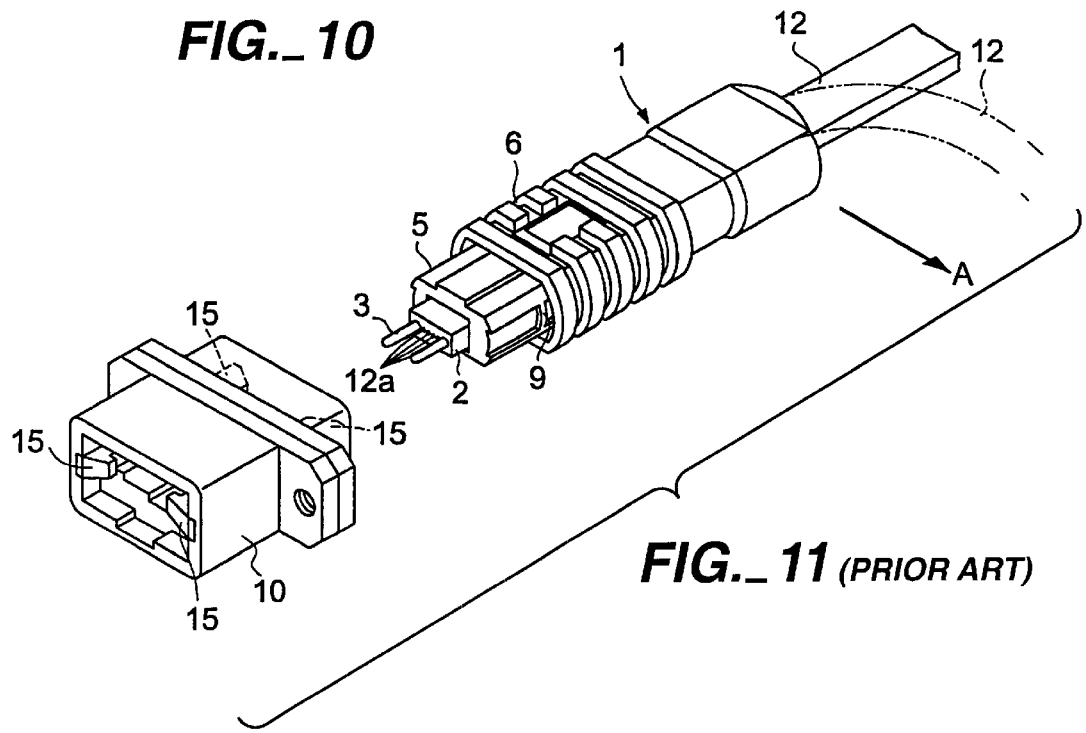
FIG._11 *(PRIOR ART)*

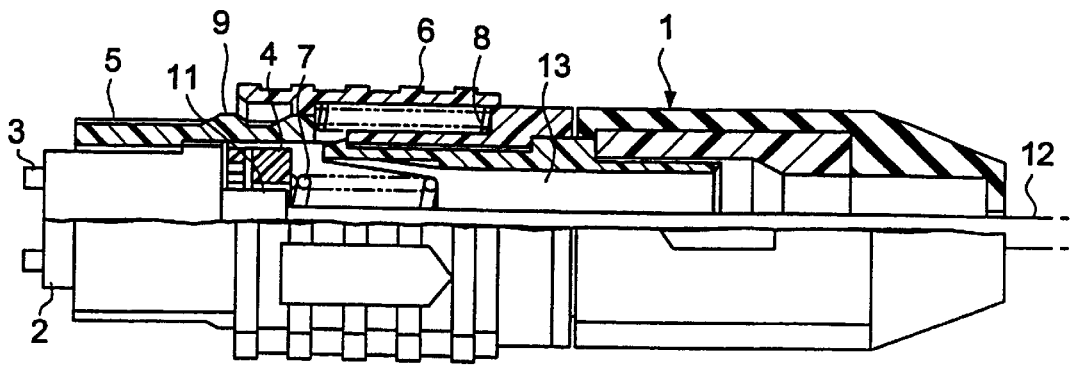
FIG._12 (PRIOR ART)
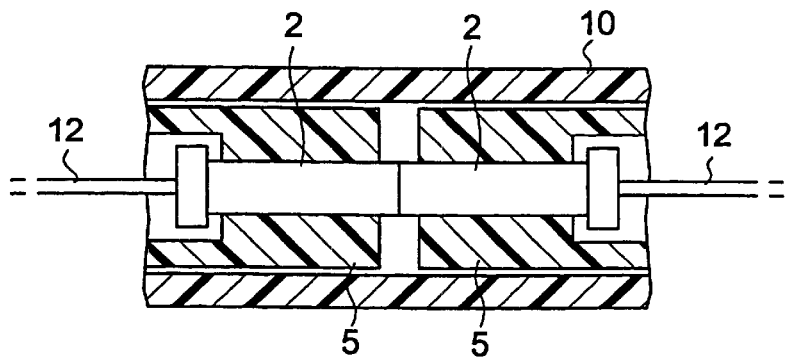
FIG._13 (PRIOR ART)
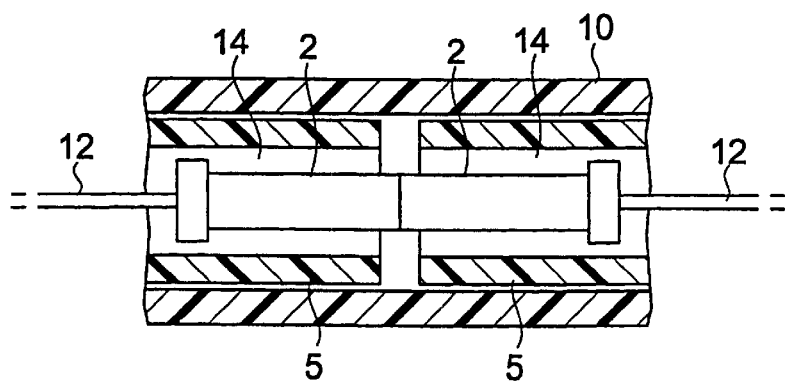
FIG._14 (PRIOR ART)

OPTICAL CONNECTOR

BACKGROUND OF THE INVENTION

1. Field of the Invention

The present invention relates of optical connectors, and in particular, to an optical connector whose structure accommodates in a housing an optical connector ferrule urged forward towards a butt connection by an urging means.

2. Description of the Related Art

Optical connector ferrules such as those stipulated by JIS C 5981 (Japanese Industrial Standards) have been proposed as optical connectors which switchably connect together optical fibers.

In addition, recently, in consideration of, for example, improving the connection operability of this optical connector ferrule, what are termed MPO connectors (connectors optical connectors whose structure accommodates a multi-core optical fiber connector ferrule stipulated, for example, by JIS C 5981 in a plastic housing) have been used widely.

FIG. 11 and FIG. 12 show this MPO connector. In FIG. 12, this MPO connector 1 is stipulated by Japan Industrial Standards, JIS C 5982, and the International Electronics Standards Committee, EEC publication 1754-7, and has a structure wherein an optical connector ferrule 2, whose end is PC (physical contact) polished as stipulated by JIS C 5981, etc., and a pin clamp 4, which clamps a guide pin 3 inserted into this optical connector ferrule 2 in the vicinity (FIG. 12, right side) of the back end of the optical connector ferrule 2, are supported within a sleeve-like housing 5, the back end of this housing 5 is supported within a sleeve-like coupling 6, and an abutment force generating coil spring 7 is accommodated by the coupling 6. The optical connector ferrule 2 can move forward and backward (left to right in FIG. 12) in the housing 5, the housing 5 is urged forward (to the left side in FIG. 12) by the housing spring 8 installed separately, and when the optical connector ferrule 2 in inserted into the MPO connector 1, if the housing 5 is in the end position of the MPO connector 1 and does not move with the optical connector ferrule 2, then the optical connector ferrule 2 is completely inserted into the housing 5. When the housing 5 is inserted into the optical connector adapter 10 (see FIG. 11), the jacks 15 formed on this optical connector adapter 10 engage detachably with the engagement part 9 of the housing 5 side surface, and thereby the inserted state of the MPO is maintained.

Reference numeral 11 in FIG. 12 is a boot, and from its back end, and the optical fiber 12 (in this figure, optical fiber ribbon cords stipulated by JIS C 6839, etc.), which can terminate in a butt connection due to the optical connector ferrule 2, is pulled out. The exposed ends of the optical fiber core of the optical fiber 12, which is an optical fiber ribbon cord, are terminated by the optical connector ferrule 2, and the cord part is anchored in the housing 5.

Reference numeral 13 in FIG. 12 is the interior cavity, and accommodates a coil spring 7 that this optical fiber passes through.

However, in the above-described MPO connector 1, a pair of MPO connectors 1 are butt connected only by insertion from both sides of the optical connector adapter 10, and good optical characteristics and connection operability are attained. But, for example, as shown by the line in FIG. 11, when the optical fiber 12 pulled out from the back end of one connected MPO connector 1 is being pulled, and a pulling force is applied in the sideways direction on the MPO connector 1 (what is termed 'side pull'), there is the possibility that the connections will not be aligned and that the characteristics may deteriorate due to sideways pressure being applied to the optical connector ferrules 2, 2 in a connected state.

That is, when a pulling force is applied in a direction other than the axial direction of the MPO connector 1, for example, in the direction of the arrow A, to the MPO connector 1 shown in FIG. 11, this plastic MPO connector 1 may be slightly displaced due to the small gap which exists between the range of deformability of the connector itself and the optical connector adapter 10, or the small gap between the optical connector ferrule 2 side surface and the wall surface inside the housing 5. On the other hand, when side pull above a tolerance value is applied, as shown in the conceptual diagram of FIG. 13, because the optical connector ferrule 2 positioned in the housing 5 is displaced as a whole with the MPO connector 1, displacement of the pressure force on the optical connector ferrule 2 of the MPO connector 1, which is the counterpart optical connector ferrule 2 of this MPO connector 1, and misalignment are produced, and thus it is possible that the object of low connection loss cannot be attained. Specifically, at the butt connection between the optical connector ferrules 2, the PC (Physical Contact) polished ends of the optical fibers 12a (bare fibers) exposed at the junction end surface 2a of the optical connector ferrule 2 are precisely butt connected by a specified pressure force, and between the several $\mu$m to several tens of $\mu$m diameter cores of the optical fibers 12a there is optical coupling, but when a slight displacement of the optical connector ferrule 2 in the MPO connector 1 is produced because of small deformations, etc., due to side pull of the MPO connector 1, a bias in the pressure force between the optical fibers 12a and misalignment of the optical axis are produced, an ideal PC connection state cannot be maintained, and connection loss between the cores of the optical fiber 12a in the abutted state is increased, That is, there are cases in which PC connection is possible. In addition, precision in the positioning between the optical connector ferrules 2 can be obtained by the engagement between the guide pin 3 (see FIG. 11) and the guide pin holes on the counterpart optical connector ferrule 2, but when the side pressure applied to the optical connector ferrule 2 becomes large, the optical connector ferrule 2 and the guide pin 3 can be damaged and fail, and the precision of the positioning is lowered.

In consideration of this problem, as shown, for example, in FIG. 14, one countermeasure is to provide a large clearance 14 which permits a floating of the optical connector ferrule 2 in the housing of the MPO connector 1. In this case, the application to the optical connector ferrule 2 of the sideways pulling force applied to the MPO connector 1 due to displacement of the optical connector ferrule in the housing 5 can be largely avoided. However, presently, the support position of the optical connector ferrule 2 in the MPO connector 1 becomes unstable, and it is difficult to fit a guide pin 3 inserted into one optical connector ferrule 2 into the guide pin hole of the other optical connector ferrule 2, and thus there is the problem that the connection operation between optical connector ferrules 2 deteriorates, and no fundamental solution to this problem has been achieved.

SUMMARY OF THE INVENTION

In light of the above-described problems, it is the object of the present invention to provide an optical connector which:

a) can ensure connection operability by stably maintaining an optical connector ferrule in a specified position in a housing during the connection operation between optical connector ferrules by a positioning retaining part, and can stably and reliably obtain favorable optical connection characteristics such as the intended low connection loss by preventing production of misalignment between optical connection ferrules after completion of the connection even if an external force is applied sideways on the housing; and b) prevents the external force applied in the sideways direction to the housing from being applied to the optical connector ferrule and maintaining stably and reliably the PC connection state between optical connector ferrules by permitting the rotation of the optical connector ferrule centered on a rotating bearing part and floating in the housing when the optical connector ferrule is inserted into the housing and a stop guard is released from a position retaining part.

Thus the present invention is characterized in an optical connector in which an optical connector ferrule that can terminate an optical fiber by a butt connection is stored in a sleeve-like housing so as to be able to move in a direction axial to this housing, and further, said optical connector ferrule is urged by an urging means in a direction towards the butt connection from one end of an opening in the axial direction of said housing, wherein: a stop guard, which is releasably accommodated and supported by a positioning support part furnished in this housing, projects from said optical connector ferrule; a ferrule accommodating hole, which accommodates said stop guard permitting floating due to clearance away from the butt connection direction by said positioning support part of said housing, is provided; said optical connector ferrule is positioned and supported by said stop guard being accommodated in said position supporting part when said optical connector ferrule is urged by said urging means and moves towards said butt connection; and the floating of said optical connector ferrule in said housing is permitted by said stop guard being released from said position supporting part when said optical connector ferrule resists the urging force of said urging means and is pressed away from said butt connection direction.

According to the optical connector of the present invention, the superior effect is achieved that during the connection operation between optical connector ferrules, the connection operability can be ensured because the optical connector ferrule is stably maintained at a certain position and in a certain direction due to the stop guard accommodated and retained in the position retaining part, and after the connection is completed, because a gap permitting only the floating of the optical connector ferrule is ensured, even if external force in the sideways direction in the housing is applied, misalignment between optical connector ferrules is prevented, and the intended optical connectability characteristics can be stably and reliably obtained.

Moreover, in the present invention, the optical connector ferrule can be used for either single or multiple cores, and in addition, the shape of the optical connector ferrule can be used for flat, round, or any other kind of optical fiber of shape.

In addition, a preferred structure is one wherein the opening part of said housing is a tapered opening part whose shape expands in a taper towards the butt connection direction, and in the vicinity of this tapered opening part, a projecting rotation support part which freely rotatably maintains said optical connector ferrule is disposed, and said optical connector which rotates centered on this rotation support part becomes freely rotatable within the range of said tapered opening part.

In this case, a superior effect is attained wherein when the optical connector ferrule is inserted into the housing and the stop guard is separated from the positioning bearing part, free rotation centered on the rotating support part of the optical connector ferrule within the range of the tapered opening part formed in the ferrule accommodation hole is permitted, and thus it is possible to prevent an external force applied sideways to the housing from being applied to the optical connector ferrule, and the connection state between optical connector ferrules can be stably and reliably supported.

BRIEF DESCRIPTION OF THE DRAWINGS

FIG. 1 is a total perspective view showing the first embodiment of the optical connector of he present invention.

FIG. 2 is a planer cross-sectional view showing a simplification of the interior of the optical connector in FIG. 1.

FIG. 3 is a side cross-sectional view showing a simplification of the interior of the optical connector in FIG. 1.

FIG. 4 is a perspective view showing the housing of the optical connector in FIG. 1.

FIG. 5 is a cut-away cross-sectional view showing the vicinity of the end in the butt connection direction of the housing, and shows the state of the optical connector ferrule pushed into the housing.

FIG. 6 is a planar cross-sectional view (a cross-sectional view along the arrow C—C in FIG. 5) showing the vicinity of the tapered opening part of the housing of the optical connector in FIG. 1.

FIG. 7 is a side cross-sectional view (a cross-sectional view along the arrow D—D in FIG. 5) showing the vicinity of the tapered opening of the housing of the optical connector in FIG. 1.

FIG. 8 shows the operation of the optical connector in FIG. 1, and is a planar cross-sectional view showing the vicinity of the tapered opening part of the housing.

FIG. 9 is a side cross-sectional view showing the vicinity of the tapered opening part of the housing.

FIG. 10 if a frontal view of the housing as seen from the side of the tapered opening.

FIG. 11 is a perspective view showing a conventional optical connector.

FIG. 12 is a planar view showing a conventional optical connector.

FIG. 13 is a side cross-sectional view showing the connected state in a conventional optical connector.

FIG. 14 is a side cross-sectional view showing the connected state in another example of a conventional optical connector.

DESCRIPTION OF PREFERRED EMBODIMENTS

Below, the preferred embodiment of the optical connector of the present invention is explained referring to FIG. 1 through FIG. 9.

Moreover, in the figures, the same reference numbers are applied to structural components identical to those in FIG. 11 and FIG. 12, and their explanation is omitted.

FIG. 1 is a total perspective view showing the optical connector 20 (MPO connector) of the present invention.

In FIG. 1, this optical connector 20 has an elongated shape, and the optical connector ferrule 2 is accommodated in the angular tube shaped housing 21 provided at the insertion direction end (the direction of the butt connection; arrow B in FIG. 1) towards the optical connector adapter 10a.

FIG. 2 is a planer cross-sectional view showing a simplification of the interior of the optical connector 20, and FIG. 3 is a frontal cross-sectional view showing a simplification of the interior of the optical connector 20.

As shown in FIG. 2 and FIG. 3, in this optical connector 20, the optical connector ferrule 2 is accommodated in the ferrule accommodation hole 22 inside the housing 21. In addition, in this ferrule accommodation hole 22, in addition to this optical connector ferrule 2, a pin clamp 3a constructed to contact the stop guard 26 projecting from the back end in the butt connection of the optical connector ferrule 2, and the bearing part 21c disposed further to the back, are also accommodated. The pin clamp 3a anchors the guide pin 3 inserted in the optical connector ferrule 2. The optical connector ferrule 2, the pin clamp 3a, and the bearing part 21c, all freely move towards and away from in the butt connection direction within the ferrule accommodation hole 22.

The back of the housing 21 (the right side in FIG. 2 and FIG. 3) accommodates an urging means 21b (coil spring) which applies to the optical connector ferrule 2 an urging force towards the abutment connector direction. This urging member 21b ensures the reactive force in the optical connector 20, and transmits the urging force to the optical connector ferrule 2 via the bearing part 21c and the pin clamp 3a.

In FIG. 2 and FIG. 3, reference numeral 20a is a coupling, 20b is a coupling spring, and 20c is a boot. In addition, reference 20e is a pressing wheel which bears the back end of the urging means 21b, and 20f is a ring anchored by an adhesive or caulking to the back end of the pushing wheel. A tensile strength body 12b (Kevler) is pulled out from the optical fiber 12 end that is a tapered optical fiber cord wherein the optical fiber ribbon cords are covered by a reinforced tube, etc., and is inserted between the pushing wheel 20e and the ring 20f from the back, and by inserting and anchoring this tensile strength body 12b between the pushing wheel 20e and the ring 20 anchored by caulking and adhesive on its outside, the optical fiber 12 is retained so it cannot be pulled towards the back. The retaining structure for the optical fiber 12 is not limited to anchoring between the pushing wheel 20e and the ring 20f, and several types of structure can be adapted: for example, it is possible to adapt a clamp anchor, etc., which can correspond to the retaining of the optical fiber not having a tensile strength body. In addition, the optical fiber ribbon core 12c part exposed at the end of the optical fiber 12 end passes through the urging means 12b, which is a bearing part 21c, a pin clamp 3a, and a coil spring.

Moreover, it is possible to eliminate the support part 21c, and apply the urging force of the urging means 21b directly to the pin clamp 3a, and the bearing part function can be incorporated into the pin clamp 3a. The bearing part 21c plays the role of a spacer in order to generate the intended urging force in the urging means 21b of the coil spring, etc. In order to do this, if the dimensions of the bearing part 21c are adjusted to the length of the adjusting urging means 21b, corresponding to the length from the pushing wheel 20e to the bearing 21c, then it is possible to reliably and simply attain the intended urging force in this urging means 21b, and a flexibility in the design dimensions of the optical connector 20 can be attained.

As an urging means for urging the optical connector ferrule 2, besides the coil spring, it is possible to use any type of elastic body made of a flat spring, rubber, etc.

FIG. 4 is a perspective view showing the housing 21.

As shown in FIG. 2 and FIG. 4, on the side surface of both sides of the housing 2 are provided the engaging part 21d which is engaged by the engagement jack 15 of the optical connector adapter 10a (refer to FIG. 1), the contact part which governs the movement towards direction by contacting the coupling 20a, the bearing projection 21f which bears the end of the coupling spring 20b, and an anchoring hole 21g into which the pushing wheel anchoring part 20g fits in order to anchor the pushing wheel 20e. In addition, on the upper surface 21h of the housing 21, the positioning key 21i for the optical connector adapter 10a projects, extending along the axial direction of the housing 21. In addition, as shown in FIG. 3, the projection 20d projecting from the inside surface of the sleeve-like coupling 20a is in contact with the lower housing surface facing the housing upper surface 21h from which this the key 21i projects, and thereby the stopper 21j which prevents the extraction of this coupling 20a projects.

FIG. 5 shows the vicinity of the end in the butt connection direction of the housing 21.

On the end towards the butt connection direction of this housing 21, the tapered opening part 23, whose shape expands in a tapered shape widening towards the end in the direction towards the butt connection, opens. The optical connector ferrule 2 is always urged in the butt connection direction by the urging force of the urging means 21b, and the vicinity of the engagement end surface 2a projects continually outside the tapered opening part 23. The optical connector ferrule 2 is pushed away form the butt connection direction due to the resistance to the urging force of the urging member 21b, and thereby while the urging means 21b is compressed, it is possible to push it into the inside of the housing 21 (the upper right in FIG. 5).

In the ferrule accommodation hole 22 in the vicinity of the tapered opening part 23, a positioning support part 24 and a rotating support part 25 are formed, and in the optical connector ferrule 2, the stop guard 26 engages the positioning support part 24, and thereby the movement range towards the butt connection direction is set.

FIG. 6 is a cross-sectional view along the C—C arrow of FIG. 5 showing the vicinity of the tapered opening part 23 of the housing 21, and FIG. 7 is a cross-sectional view along the D—D arrow in FIG. 5.

In FIG. 6, the positioning support part 24 is a stage formed on both sides facing the inner surface of the ferrule accommodation hole 22 farther inside than the tapered opening part 23 of the housing 21, has a shape which engages with the stop guard 26 of the optical connector ferrule 2, and stably accommodates the engaged stop guard 26. As shown in FIG. 5, the optical connector ferrule 2 has an elongated plate shape, and as shown in FIG. 6, on this positioning support part 24, this stop guard 26, in the planar cross-sectional view (top to bottom in FIG. 6) on both sides of this optical connector ferrule 2, is detachably engaged. In addition, when the optical connector ferrule is inserted into the inside (right side of FIG. 6) of the housing 21, as shown in FIG. 5, FIG. 8, and FIG. 9, the stop guard is quickly released from the positioning support part 24.

The positioning support part 24 has an angular inner surface which conforms to the shape of the circumferential part of the stop guard 26, but the circumferential part of the stop guard 26 is not limited to an angular shape, and for example, can also be a curve. The positioning support part 24 corresponds to the circumferential shape of the stop guard 26, and when in contact, it is possible to position the stop guard 26, and when inserted into the optical connector ferrule 2, is formed in a shape which can be detached. That is, if the circumference of the stop guard 26 is a chamfered curved shape, the circumference of the stop guard 26 and the positioning support part 24 are formed so as to conform to each other in such a way that the positioning support part is also formed in a curved shape. Even if the positioning support part and the circumference of the stop guard have shapes other than those in FIG. 5, FIG. 8, and FIG. 9, it is possible to position the stop guard 26 and position the optical connector ferrule 2 by making them mutually tightly fitting.

As shown in FIG. 8 and FIG. 9, in the ferrule accommodation hole 22, the clearance in the area of the optical connector ferrule 2, the pin clamp 3a, and the bearing part 21c is ensured. This clearance is t1+t2 in FIG. 8 and t3+t4 in FIG. 9, and when the optical connector ferrule 2 is inserted into the housing 21 and the stop guard 26 of the optical connector ferrule is released from the positioning support part 24, the floating of the optical connector ferrule 2 is permitted within the range of this clearance. In addition, because the optical connector ferrule 2, the pin clamp 3a, and the bearing part 21c are not mutually anchoring, each can float independently in the ferrule accommodation hole 22.

In FIG. 6, a rotation support part 25 projects form the vicinity of the positioning support parts 24 on both sides. The tip of the rotation support part 25 projects in the direction of the center part of the ferrule accommodation hole 22, and has a tapering shape. As shown in FIG. 8, when the optical connector ferrule 2 is inserted within the housing 21, as shown by the arrow E, the optical connector ferrule 2 is rotatably supported. At this time, the range of permitted rotation in the direction of arrow E by the optical connector ferrule is set by the clearance t1+t2 of the ferrule accommodation hole 22, and the optical connector ferrule 2 is not in contact with the inner surface of the tapered opening part 23. Thereby, when, for example, the optical fiber 12 is subject to sideways pull, due to the sideways force, the optical connector 20 will be slightly displaced due to the slight gap existing between it and the optical connector adapter 10, or due to the slight gap between the side surface of the optical connector ferrule 2 and the wall surface inside the housing 5, but even when the housing 21 is displaced so as to be at an angle (deformation in the direction of the arrow F in FIG. 8; displacement in the direction of arrow G in FIG. 9), to the extent that an extreme pressure above a permitted value is not applied, in neither the ferrule accommodation 22 nor the tapered opening part 23 is the optical connector ferrule 2 pressed against the housing 21, and the force in this sideways direction can be stopped from influencing the connection state between the optical connector ferrule 2 and another optical connector ferrule 2b which is butt connected with this optical connector ferrule 2. That is, even if a deformation in the housing 21 is produced by side pull, the optical connector ferrules 2, 2b in the connected state are not displaced, and the PC connection state between the optical connector ferrules 2, 2b is stable. Furthermore, because the optical connector ferrule 2, the pin clamp 3a, and bearing part 21c can each float independently in the ferrule accommodation hole 22, even if in the worst case the external force applied to the optical connector 20 is applied to the pin clamp 3a, this force is not applied to the optical connector ferrule 2 via the bearing part 21c or the pin clamp 3a.

In FIG. 8, 10a is the optical connector adapter. This optical connector adapter 10a can have a structure similar to the housing used for conventional MOP connectors shown, for example, in FIG. 11.

FIG. 10 is a frontal view of the housing 21 seen from the end in the connection direction.

In FIG. 4 and FIG. 10, on the inner surface of the tapered opening part 23 at the end of the housing 21, a parting accommodation groove 27 extends along the axial direction of the housing 21 and is formed passing through both sides of the rotation support part 25. Because this parting accommodation groove 27 is formed at a position corresponding to the parting part 2c (parting line; see FIG. 5) on both sides of the optical connector ferrule 2 accommodated in the housing 21, a trimming, for example, which can be easily produced on this parting part 2c, can be easily accommodated. That is, during the formation of the resin of the plastic optical connector ferrule 2, complete elimination of the parting part 2c formed in the seam of the metal mold, etc., is very troublesome, and obtaining a product without any bur projections will unavoidably entail an increase in cost. The contact end surface 2a can be polished to eliminate inconveniences such as trimmings on the parting, but because the parting 2c on both sides requires carrying out separate elimination operations, it is very troublesome. If there are no parting accommodation grooves 27, when the parting 2c on both sides of the optical connector ferrule 2 contacts the rotation support part 25, there are the problems that the rotation of the optical connector ferrule 2 becomes unstable, or will become unable to rotate. However, in this optical connector 20, interference with the rotation support part 25 is avoided by accommodating the parting 2c in the parting accommodation groove 27, and thus it is possible to stabilize the rotation of the optical connector ferrule 2 in each rotation support part 25. In addition, simply by accommodating the parting 2c using the parting accommodation groove 27, it is possible to avoid interference with the rotation support part 25, there is no cost increase, and it is possible to stabilize the rotation of the optical connector ferrule 2.

As shown in FIG. 7 and FIG. 9, the tapered opening part 23 is formed expanding in both the upper and lower directions in the figures. In addition, inside the tapered opening part 23, support projections 28, 28 project towards each other from the inner surface of both sides of the ferrule accommodation hole 22, in the upper and lower directions of the figures.

As shown in FIG. 7, the optical connector ferrule 2 is positioned near the tapered opening part 23, and when the stop guard 26 is accommodated in the position support part 24, the stop guard 26 of the optical connector ferrule 2 is inserted and held between the support projections 28, 28 on both the upper and lower sides of the figure, and supported stably at a fixed position.

As shown in FIG. 9, the optical connector ferrule 2 is pushed into the inside of the housing 21, and while the stop guard is released from the positioning support part 24 (not shown in FIG. 9), the floating of the optical connector ferrule 2 is permitted in the range of the clearance t3+t4 and in the clearance between both support projections 28, 28 and the optical connector ferrule 2, and even if side pull is applied to the optical connector 20, in both the ferrule accommodation hole 22 and the taper opening part 23, the external force is not directly applied to the optical connector ferrule 2. However, both support projections 28, 28 only set the floating range of the optical connector ferrule 2, and do not become rotation points. Moreover, it is possible that both support projections 28, 28 also be formed so as to function as a rotation point, and in this case, it is possible for the optical connector ferrule 2 to rotate in two directions: rotating centered on the rotation support parts 25, 25 and rotation centered on the support projections 28, 28.

By inserting the optical connector adapter1a shown in FIG. 1, this optical connector 20 is connected to a separate connector 20 inserted from the opposite side. During this connection operation, as shown in FIG. 6 and FIG. 7, the optical connector ferrule 2 is urged towards the butt connection direction by the operation of the urging means 21b, and furthermore, the stop guard 26 is supported by the position support part 24 and the support projections 28, and thereby the optical connector ferrule 2 is stably supported and is not displaced. Thus, the fitting operation of the guide pin 2 and the guide pin hole between the butt connected optical connector ferrules 2 is ensured.

After the connection is made, in consideration of ensuring the abutment force between the optical connector ferrules 2, the optical connector ferrule 2 is pushed into the inside of the housing 21, and as shown in FIG. 8 and FIG. 9, because the stop guard 26 is released from the position support part 24 and the support projections 28, displacements such as the floating of the optical connector ferrule 2 and the rotation centered on the rotation support part 25 are permitted. At this time, while the housing 21 is inserted into the optical connector adapter 10a and anchored, because the optical connector ferrule 2 is not pressed to the inner surface of the ferrule accommodation hole 22 in the housing 21 due to the floating range and the rotation range, even if an sideways external force which bends the optical connector 20 is applied, and a bending deformation is produced in the housing 21, this external force is not applied directly to the optical connector ferrule 2. Thus neither of the connected optical connector ferrules 2 is displaced, and no variation in the connection pressure (the pushing force and abutment force) between the optical connector ferrules 2 is produced, and thereby the butt connection state is stably maintained. Because of this, there is no concern that misalignment between the engaged end surfaces 2a which are abutment connected will occur, and thus that misalignment between the optical fibers 12a (between the cores of the optical fibers 12) exposed at the engagement end 2a and variation in the PC connection pressure will be produced. Therefore, favorable optical characteristics such as the intended low connection loss can be stably and reliable maintained. Furthermore, because damage to the optical connector ferrule 2 due to a sideways external force can be prevented, as a result the side load capacity characteristics of the optical connector 20 are improved.

Moreover, the present invention is not limited to the above-described embodiments, and of course there are many types of possible variation.

For example, depending on the shape of the optical connector ferrule accommodated in the housing, in order for the stop guard projecting from the optical connector ferrule to be accommodated and supported, it is possible to alter the formation position of the supporting part by placing it further back in the housing. The optical connector ferrule can be structured so that an optical fiber having only one bare fiber can be formed so as to terminate abutment connectably in the end surface stipulated by JIS C 5981 in a guide pin hole. That is, the optical connector ferrule having a form stipulated for example by JIS C 5981 is generally applied to multiple cores, but if the terminating optical fiber has only one core, it is possible to use this for the single core.

In addition, either single mode or multi-mode optical fibers can be used with this optical connector.

What is claimed is:

1. An optical connector in which an optical connector ferrule adapted to terminate an optical fiber by a butt connection is stored in a sleeve-like housing so as to be able to move in a direction axial to the housing, and said optical connector ferrule is urged by an urging means in a direction towards the butt connection from one end of an opening in the axial direction of said housing, comprising;

a stop guard which is releasably accommodated and supported by a positioning support part furnished in said housing, the stop guard projecting from said optical connector ferrule; and a ferrule accommodating hole, which accomodates said stop guard permitting floating due to clearance away from the butt connection direction by said positioning support part of said housing;

said optical connector ferrule is positioned and supported by said stop guard being accommodated in said positioning support part when said optical connector ferrule is urged by said urging means and moves towards said butt connection;

the floating of said optical connector ferrule in said housing is permitted by said stop guard being released from said positioning support part when said optical connector ferrule resists the urging force of said urging means and is pressed away from said butt connection direction;

wherein the opening part of said housing is a tapered opening part whose shape expands in a taper towards the butt connection direction, and in the vicinity of this tapered opening part, a projecting rotation support part which freely rotatably maintains said optical connector ferrule is disposed, and said optical connector which rotates centered on this rotation support part becomes freely rotatable within the range of said tapered opening part.

2. An optical connector according to claim 1 wherein said housing is an angular tube, and said rotation supporting part projects from the pair of inner surfaces facing one end of the opening part, or from the two pairs of upper and lower, left and right inner surfaces in the cross sectional direction in the axial direction of said housing.

3. An optical connector according to claim 2 wherein said optical connector ferrule has an elongated plate shape.

4. An optical connector according to claim 1 wherein said positioning support part is a step formed on the inner surface of the housing by said projected rotation support part.

5. An optical connector according to claim 1 wherein said positioning support part engages the stop guard of the optical connector ferrule moving towards the butt connection direction, and thereby this optical connector ferrule functions as a stopper which prevents extraction of the housing to the outside.

6. An optical connector according to claim 1 wherein said optical connector ferrule becomes positioned and butt connected by insertion and fitting of a guide pin which protrudes from the joint end surface to which the other optical connector ferrule butt connected, and a guide pin hole which is bored in the joint end surface of the other optical connector ferrule.

7. An optical connector according to claim 1 wherein a groove which accommodates a parting of a resin optical connector ferrule is formed on the inner surface of the housing.

8. An optical connector in which an optical connector ferrule that can terminate an optical fiber by a butt connection is stored in a sleeve-like housing as as so be able to move in a direction axial to this housing, and further, said optical connector ferrule is urged by an urging means in a direction towards the butt connection from one end of an opening in the axial direction of said housing, comprising:

- a stop guard, which is releasably accommodated and supported by a positioning support part furnished in this housing, projects from said optical connector ferrule;
- a ferrule accommodating hole, which accommodates said stop guard permitting floating due to clearance away from the butt connection direction by said positioning support part of said housing, is provided;
- said optical connector ferrule is positioned and supported by said stop guard being accommodated in said positioning support part when said optical connector ferrule is urged by said urging means and moves towards said butt connection;
- the floating of said optical connector ferrule in said housing is permitted by said stop guard being released from said positioning support part when said optical connector ferrule resists the urging force of said means and is pressed away from said butt connection direction; and
- a spacer is arranged between said optical connector ferrule and said urging means so that said spacer can be separated from said optical connector ferrule.

9. An optical connector in which an optical connector ferrule that can terminate an optical fiber by a butt connection is stored in a sleeve-like housing as as to be able to move in a direction axial to this housing, and further, said optical connector ferrule is urged by an urging means in a direction towards the butt connection from one end of an opening in the axial direction of said housing, comprising:

- a stop guard, which is releasably accommodated and supported by a positioning support part furnished in this housing, projects from said optical connector ferrule;
- a ferrule accommodating hole, which accommodates said stop guard permitting floating due to clearance away from the butt connection direction by said positioning support part of said housing, is provided;
- said optical connector ferrule is positioned and supported by said stop guard being accommodated in said positioning support part when said optical connector ferrule is urged by said urging means and moves towards butt connection;
- the floating of said optical connector ferrule in said housing is permitted by said stop guard being released from said positioning support part when said optical connector ferrule resists the urging force of said urging means and is pressed away from said butt connection direction; and
- a rotation support part is formed on an inner surface of said housing so that said rotation support part supports and positions an outer surface of said optical connector ferrule while permitting a rotational movement of said optical connector ferrule around said rotation support part when said stop guard is released from said positioning support part.

* * * * *